(12) United States Patent
Anderson

(10) Patent No.: US 6,333,838 B1
(45) Date of Patent: Dec. 25, 2001

(54) VOICE COIL ACTUATED CARRIAGE IN WHICH A SUPPORT STRUCTURE FOR THE CARRIAGE IS DISPOSED AT LEAST PARTIALLY WITHIN THE MOTOR

(75) Inventor: James C. Anderson, Eagle, ID (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/102,731

(22) Filed: Jun. 22, 1998

(51) Int. Cl.$^7$ .................................................. G11B 17/30
(52) U.S. Cl. ............................................................ 360/261.1
(58) Field of Search ..................................... 360/106, 260, 360/261, 261.1, 261.2, 261.3, 251.1, 266.2–266.8; 369/244, 249, 219

(56) References Cited

U.S. PATENT DOCUMENTS

| | | | |
|---|---|---|---|
| 3,838,455 | * | 9/1974 | Barnard .............................. 360/78.04 |
| 4,314,295 | * | 2/1982 | Frandsen ............................... 360/106 |
| 4,393,425 | * | 7/1983 | Wright .................................. 360/105 |
| 4,525,696 | | 6/1985 | Vogelgesang ......................... 335/272 |
| 4,609,958 | * | 9/1986 | Irvin et al. ............................ 360/106 |
| 4,661,729 | * | 4/1987 | Hames et al. ........................... 310/13 |
| 4,694,367 | * | 9/1987 | Brent .................................... 360/106 |
| 4,754,352 | * | 6/1988 | Iwata ..................................... 360/106 |
| 4,870,703 | * | 9/1989 | Augeri et al. ....................... 360/98.07 |
| 5,041,935 | | 8/1991 | Aruga et al. .......................... 360/106 |
| 5,105,322 | * | 4/1992 | Steltzer ................................. 360/106 |
| 5,126,905 | * | 6/1992 | Nomura et al. ....................... 360/105 |
| 5,130,972 | * | 7/1992 | Mizuno et al. ....................... 369/215 |
| 5,187,702 | * | 2/1993 | Takahashi ............................. 369/215 |
| 5,243,591 | * | 9/1993 | Mogamiya ............................ 369/244 |
| 5,278,820 | * | 1/1994 | Shtipelman .......................... 369/219 |
| 5,299,183 | * | 3/1994 | Yamaguchi ........................ 369/44.14 |
| 5,379,170 | | 1/1995 | Schwarz ............................... 360/109 |
| 5,434,732 | | 7/1995 | Schwarz et al. ...................... 360/109 |
| 5,481,424 | | 1/1996 | Koseki .................................. 360/106 |
| 5,488,594 | * | 1/1996 | Kobayashi et al. ............... 369/44.14 |
| 5,504,636 | | 4/1996 | Yuki et al. ........................ 360/97.01 |
| 5,517,483 | * | 5/1996 | Choi ..................................... 369/255 |
| 5,519,554 | | 5/1996 | Todd et al. ............................ 360/106 |
| 5,566,039 | * | 10/1996 | Spicer .................................. 360/106 |
| 5,581,533 | * | 12/1996 | Fujisawa .............................. 369/112 |
| 5,684,657 | * | 11/1997 | Dijk ...................................... 360/109 |
| 5,698,911 | | 12/1997 | Dunfield et al. ....................... 310/12 |
| 5,761,182 | * | 6/1998 | Jeon ..................................... 369/219 |
| 5,764,618 | * | 6/1998 | Kim ..................................... 369/219 |
| 5,901,008 | * | 5/1999 | Nayak et al. ...................... 360/78.02 |

FOREIGN PATENT DOCUMENTS

| | | |
|---|---|---|
| 388 087 | 3/1990 | (EP) . |
| 595785 | 5/1994 | (EP) . |
| 59168924 | 9/1984 | (JP) . |
| 04060915 | 2/1992 | (JP) . |
| 4-143932 | * 5/1992 | (JP) . |
| WO 95 16986 | 6/1995 | (WO) . |
| WO 96 13833 | 5/1996 | (WO) . |

* cited by examiner

Primary Examiner—Brian E. Miller

(57) ABSTRACT

A servo positioned carriage and actuator assembly in which the support structure for the carriage is located at least partially within the central portion of the motor. In one embodiment, the assembly includes a motor, a guide rail and a carriage that travels along the guide rail. The motor has a coil of electrically conductive windings and a magnet or magnets adjacent to the coil. The inside perimeter of the coil defines the central portion of the motor. The guide rail extends axially through the central portion of the motor.

10 Claims, 11 Drawing Sheets

VOICE COIL ACTUATED CARRIAGE IN WHICH A SUPPORT STRUCTURE FOR THE CARRIAGE IS DISPOSED AT LEAST PARTIALLY WITHIN THE MOTOR

FIELD OF THE INVENTION

The present invention relates generally to servo positioned actuators, and more particularly, to a carriage and positioning actuator assembly in which the support structure for the carriage is located at least partially within the central portion of the motor.

BACKGROUND OF THE INVENTION

Information is recorded on and read from a moving magnetic tape with a magnetic read/write head positioned next to the tape. The magnetic "head" may be a single head or, as is common, a series of read/write head elements stacked individually and/or in pairs within the head unit. Data is recorded in tracks on the tape by moving the tape lengthwise past the head. The head elements are selectively activated by electric currents representing the information to be recorded on the tape. The information is read from the tape by moving the tape longitudinally past the head elements so that magnetic flux patterns on the tape create electric signals in the head elements. These signals represent the information stored on the tape.

Data is recorded on and read from each of the parallel tracks on the tape by positioning the head elements at different locations across the tape. That is, head elements are moved from track to track as necessary to either record or read the desired information. Movement of the magnetic head is controlled by an actuator operatively coupled to some type of servo control circuitry. Tape drive head positioning actuators often include a lead screw driven by a stepper motor, a voice coil motor, or a combination of both. The carriage that supports the head is driven by the actuator along a path perpendicular to the direction that the tape travels. The head elements are positioned as close to the center of a track as possible based upon the servo information recorded on the tape.

SUMMARY OF THE INVENTION

The present invention is directed in general to a servo positioned carriage and actuator assembly and, more particularly, to a head carriage and actuator assembly for a tape drive. The support structure for the carriage is located at least partially within the central portion of the motor. This configuration provides a new compact design that minimizes the overall mass of the carriage elements of the actuator. In one embodiment, the assembly includes a motor, a guide rail and a carriage that travels along the guide rail. The motor, typically a voice coil motor, has a coil of electrically conductive windings and a magnet or magnets adjacent to the coil. The inside perimeter of the coil defines the central portion of the motor. The guide rail extends axially through the central portion of the motor. In a second embodiment, a post extends axially through the inside of an annular coil and the carriage travels on a pair of guide rails. The first guide rail is secured to the post and extends axially through the inside of the coil along the post. The second guide rail is positioned outside the coil radially opposite and parallel to the first guide rail.

DESCRIPTION OF THE DRAWINGS

FIG. 6A illustrates the carriage without the coil. FIG. 6B illustrates the carriage with the coil installed in the carriage. FIG. 6C illustrates a carriage in which a non-conductive break is made between the center portions of the carriage and the back portion of the carriage.

DETAILED DESCRIPTION OF THE INVENTION

Figure 1:
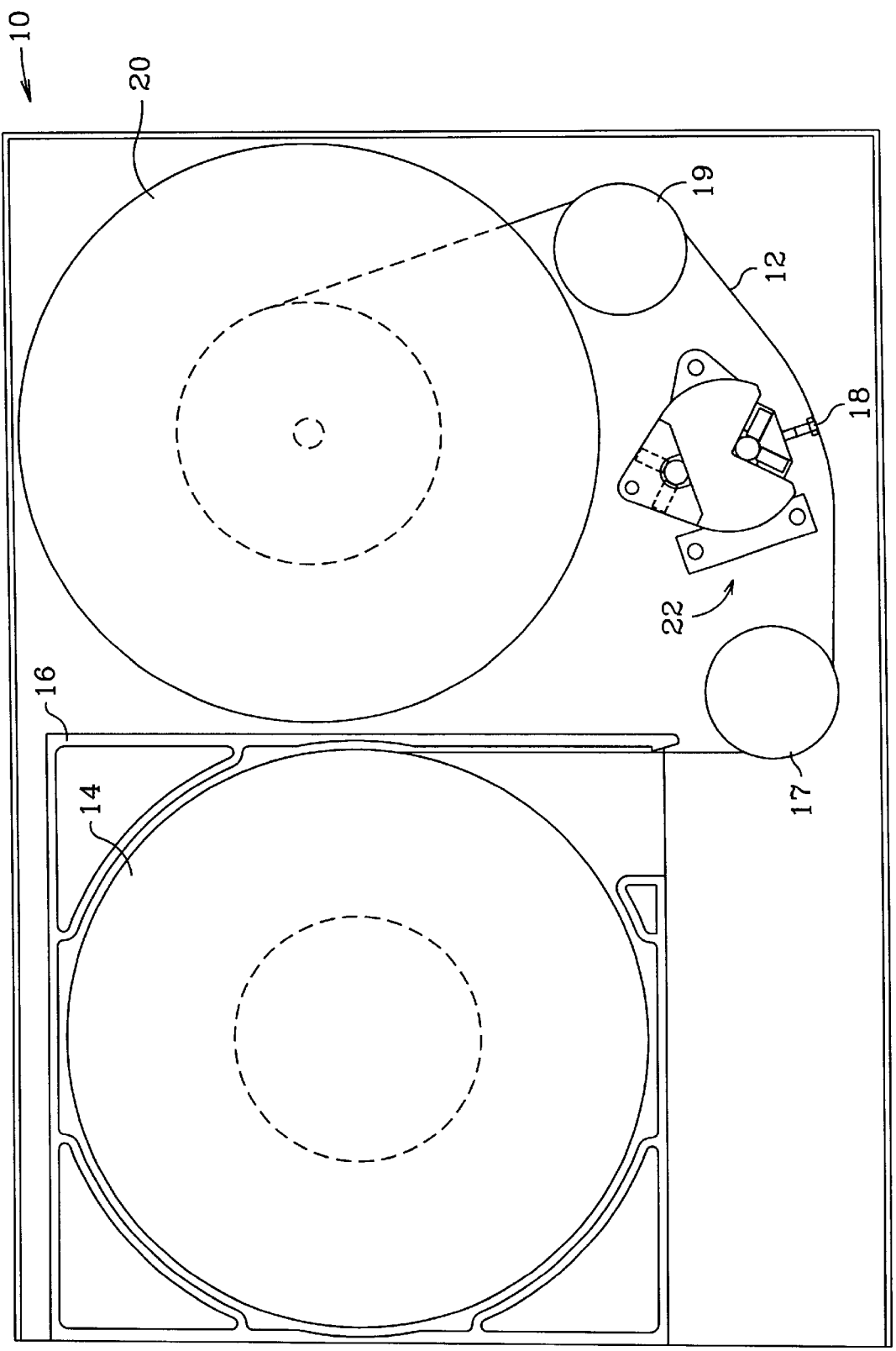
FIG. 1 is a top down plan view of a tape drive incorporating a head positioning actuator constructed according to one embodiment of the present invention.

Referring first to FIG. 1, a magnetic tape 12 is wound on a single supply spool 14 and tape cartridge 16. Tape cartridge 16 is inserted into tape drive 10 for read and write operations. Tape 12 passes around tape guide 17, over a magnetic read/write head 18, around tape guide 19 to take up spool 20. Head 18 is mounted to a head carriage and actuator assembly 22 that includes a variety of operational features related to head 18. Head carriage and actuator assembly 22 is also referred to for convenience as actuator 22. Magnetic head 18 engages tape 12 as tape 12 moves across the face of head 18 to record data on tape 12 and to read data from tape 12.

Figure 2:
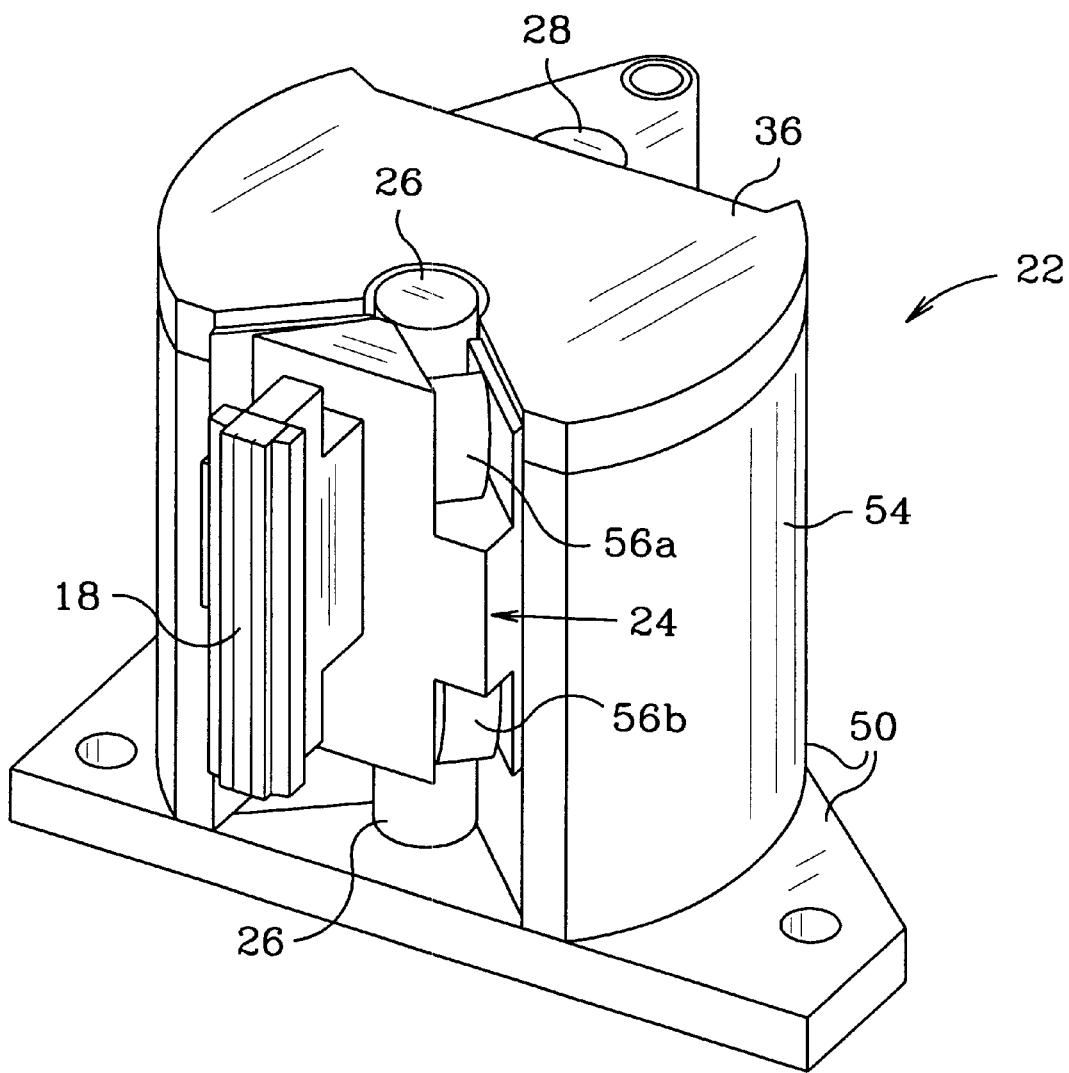
FIG. 2 is a perspective view of the moveable carriage and head positioning actuator of FIG. 1.
Figure 3A:
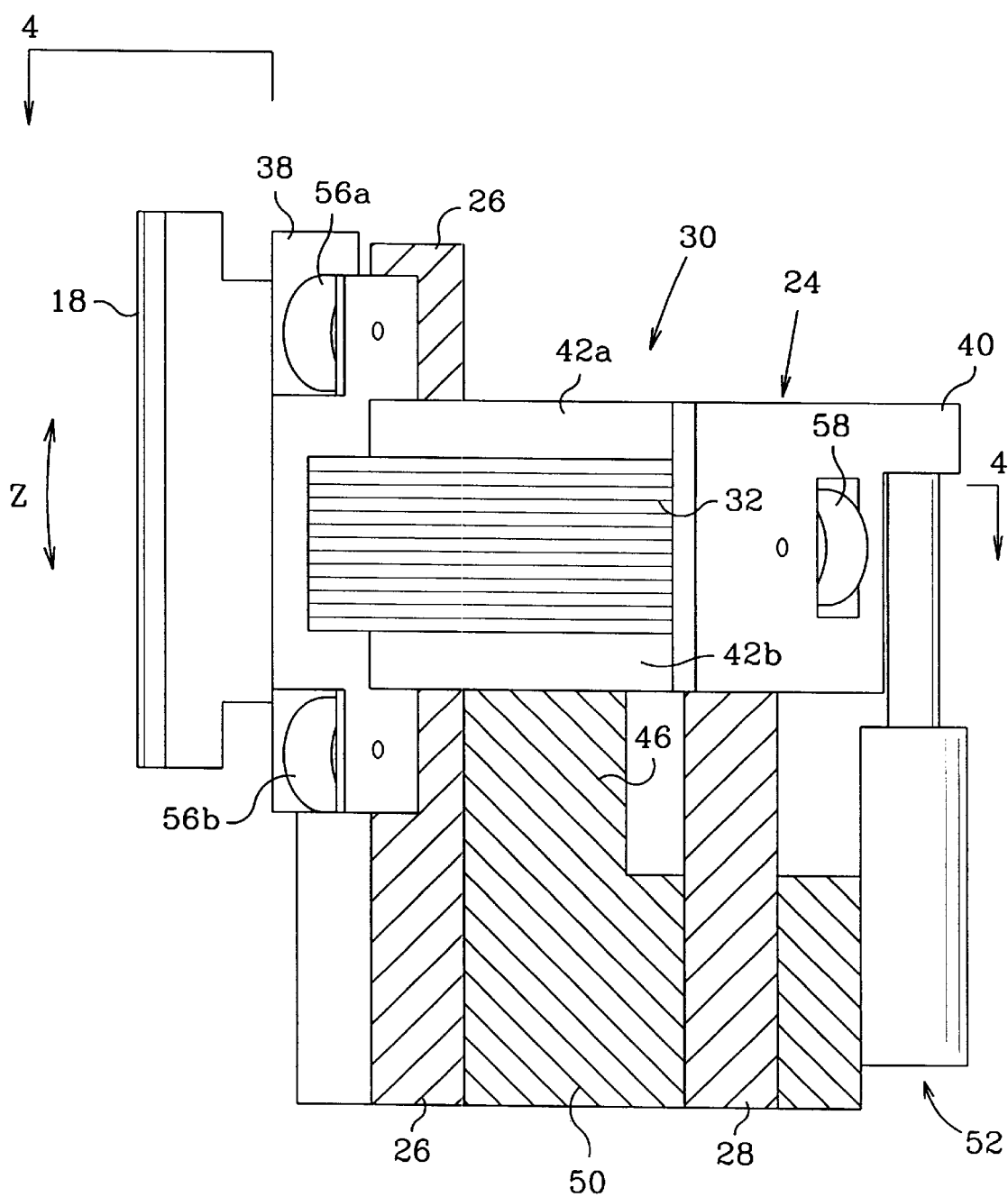
FIGS. 3A and 3B are side elevation and partial section views of the moveable carriage and head positioning actuator of FIGS. 1 and 2 in different positions along the guide rails.
Figure 3B:
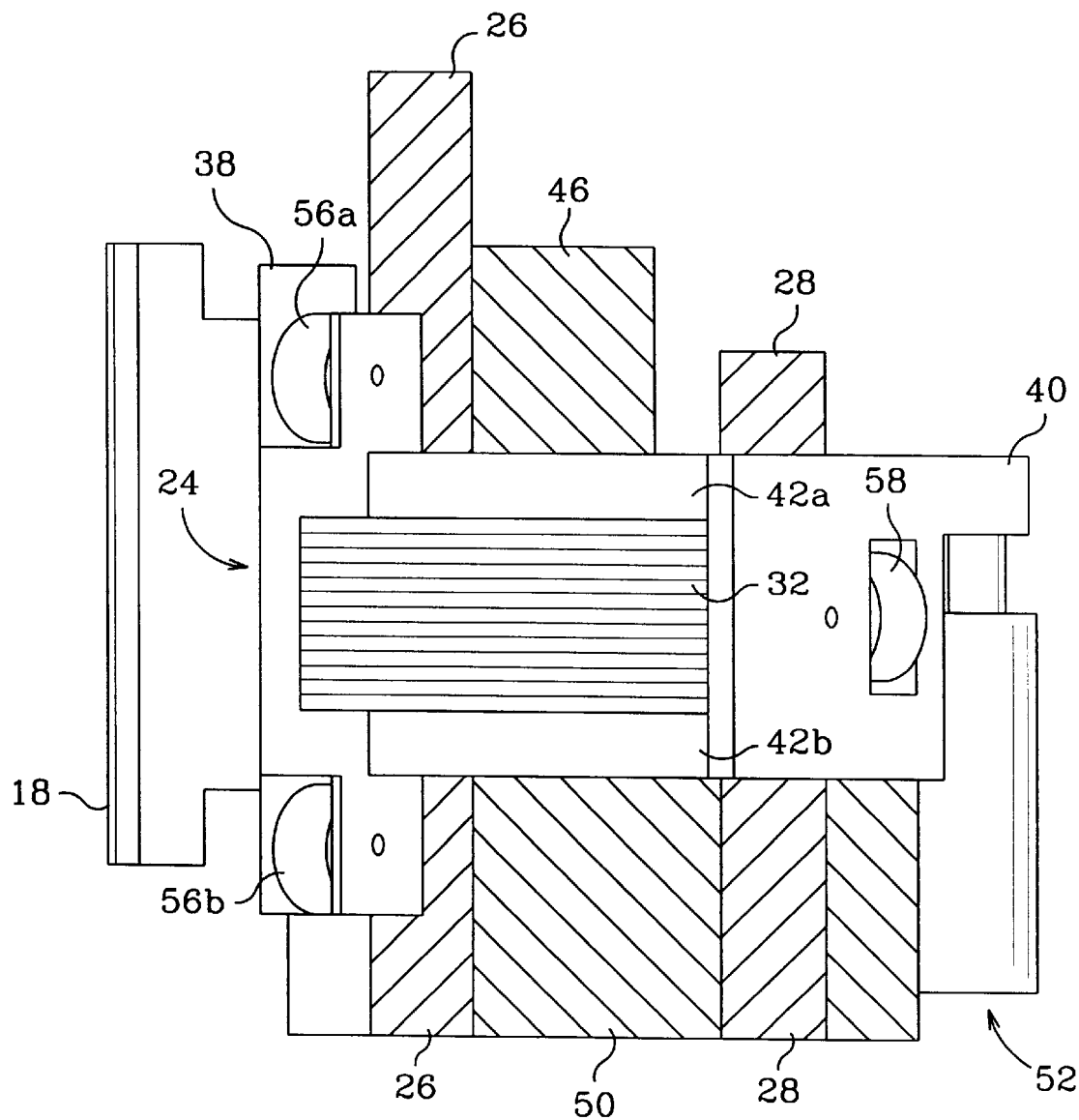
Figure 4:
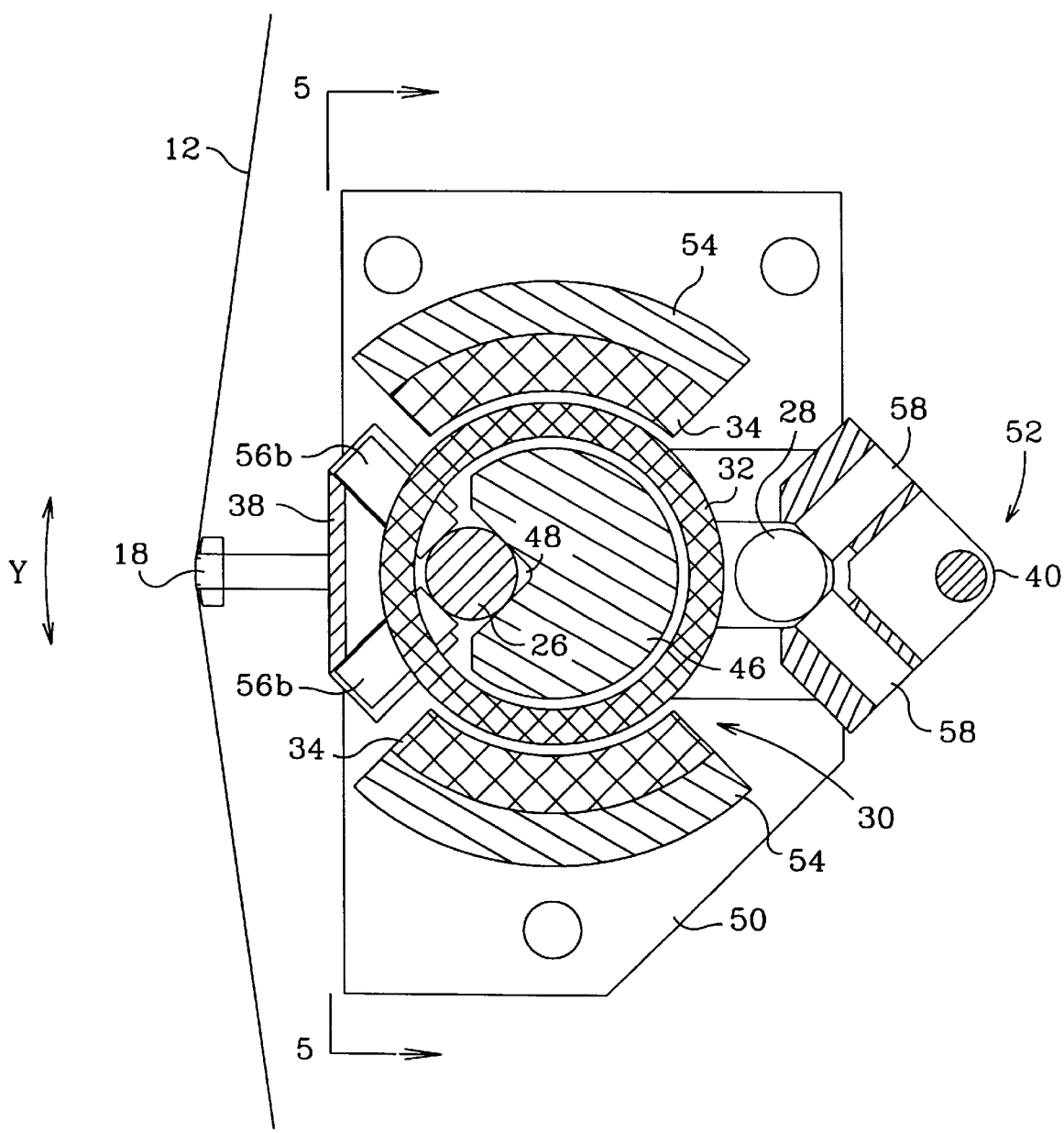
FIG. 4 is a top down plan and partial section view of the moveable carriage and head positioning actuator taken along the line 4—4 in FIG. 3A.
Figure 5:
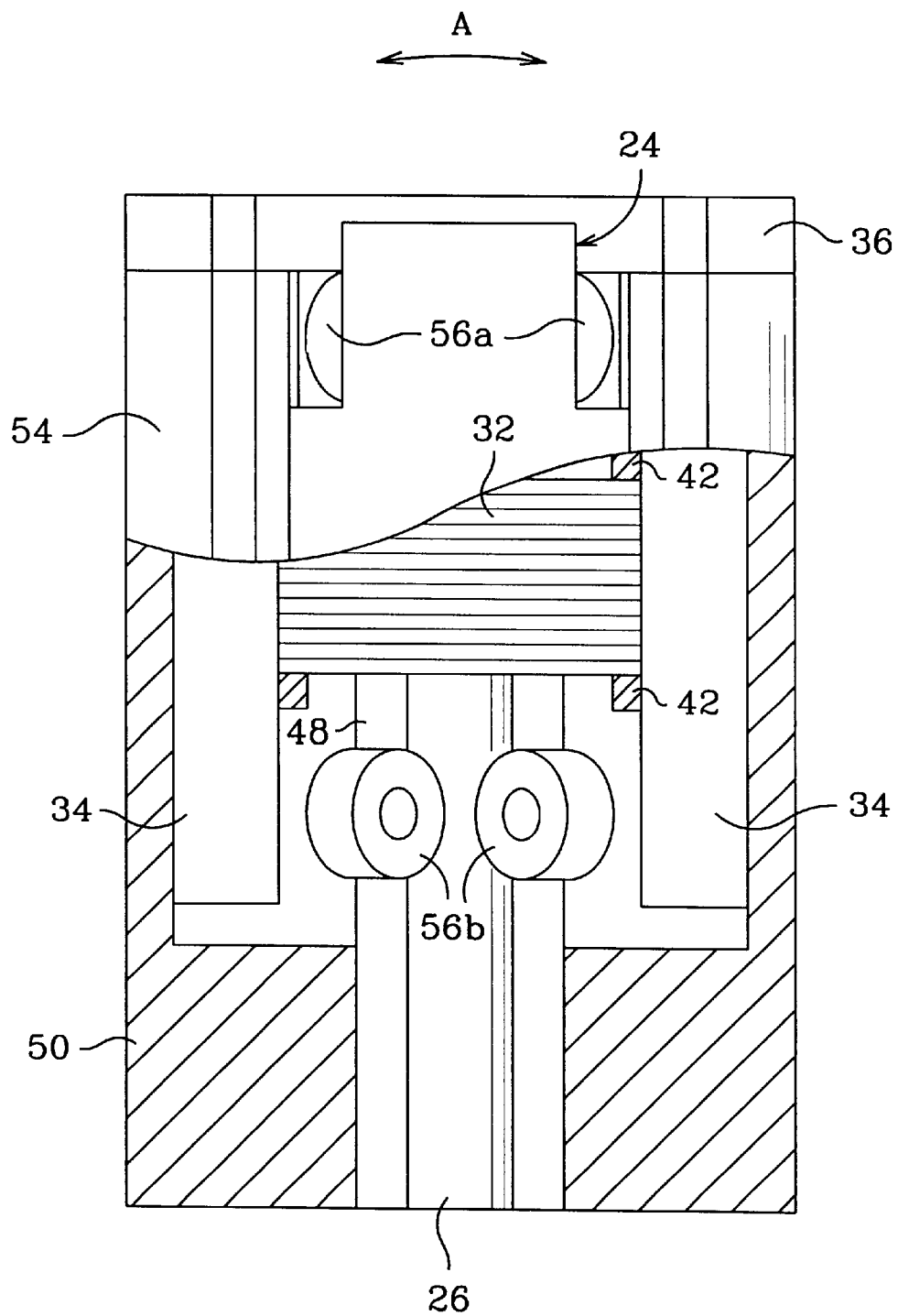
FIG. 5 is a front elevation and partial cut-away view of the moveable carriage and head positioning actuator as viewed along the line 5—5 in FIG. 4.

FIG. 2 is a perspective view of the actuator 22. FIGS. 3, 4 and 5 are elevation and plan views of actuator 22. The operative components of actuator 22 are best seen in FIGS. 3–5. Referring to FIGS. 2–5, head 18 is carried by a moveable carriage 24. Carriage 24 moves up and down along a primary guide rail 26 and a secondary guide rail 28 at the urging of voice coil motor 30. Head 18, which is carried by carriage 24, therefore, also moves up and down in a direction perpendicular to the direction of tape travel as desired to properly position head 18 for reading and writing operations. FIGS. 3A and 3B show carriage 24 and head 18 in different positions along the guide rails.

Voice coil motor 30 includes a coil 32 and magnets 34. Magnets 34 are attached to the inside of sidewalls 54 of actuator base 50. Top flux plate 36 fits on top of sidewalls 54 of base 50. Actuator base 50 is secured to the frame or another stable component of tape drive 10. Coil 32 is mounted to carriage 24.

Figure 6A:
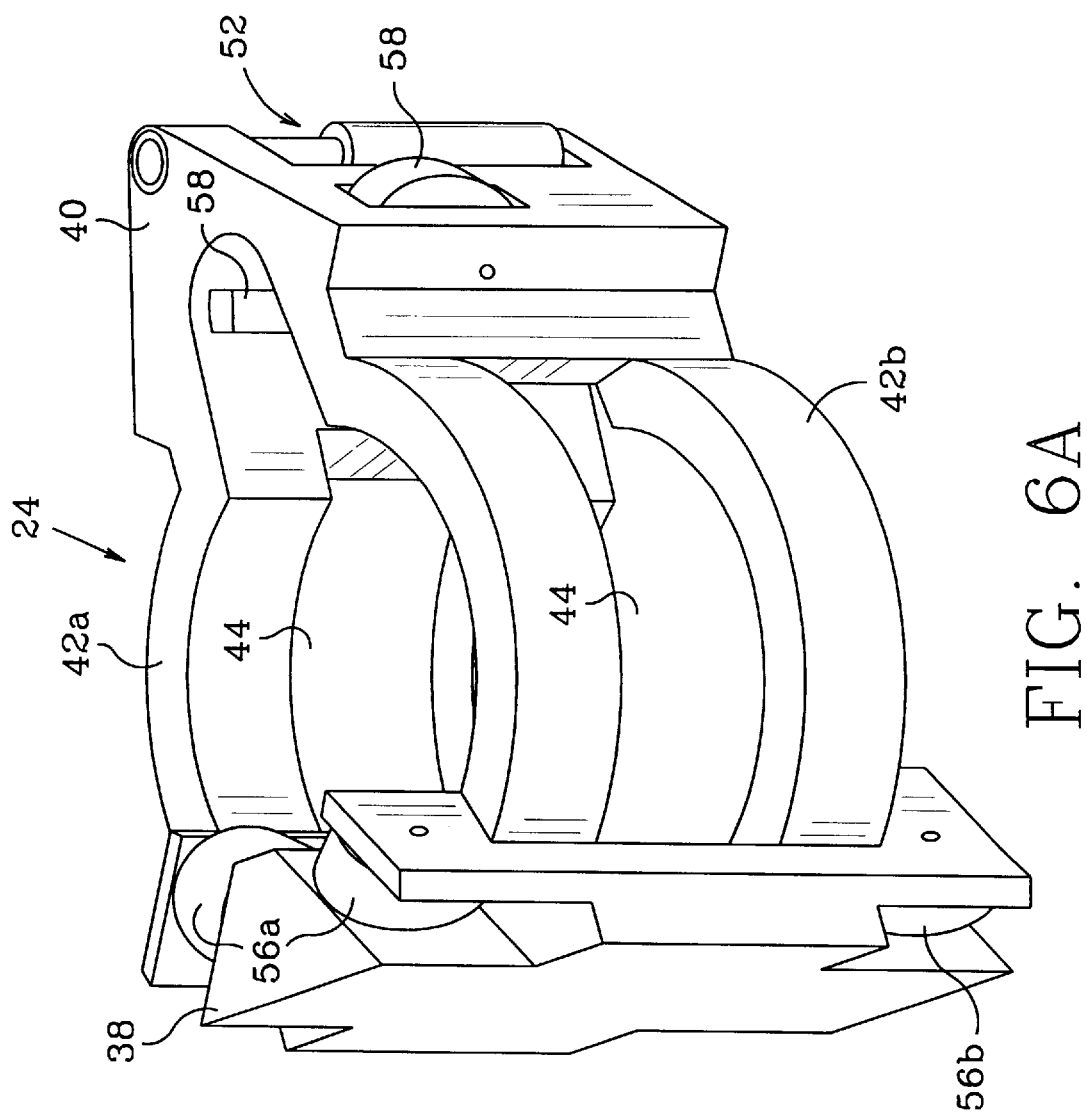
FIGS. 6A, 6B and 6C are detail perspective views of the head carriage.
Figure 6B:
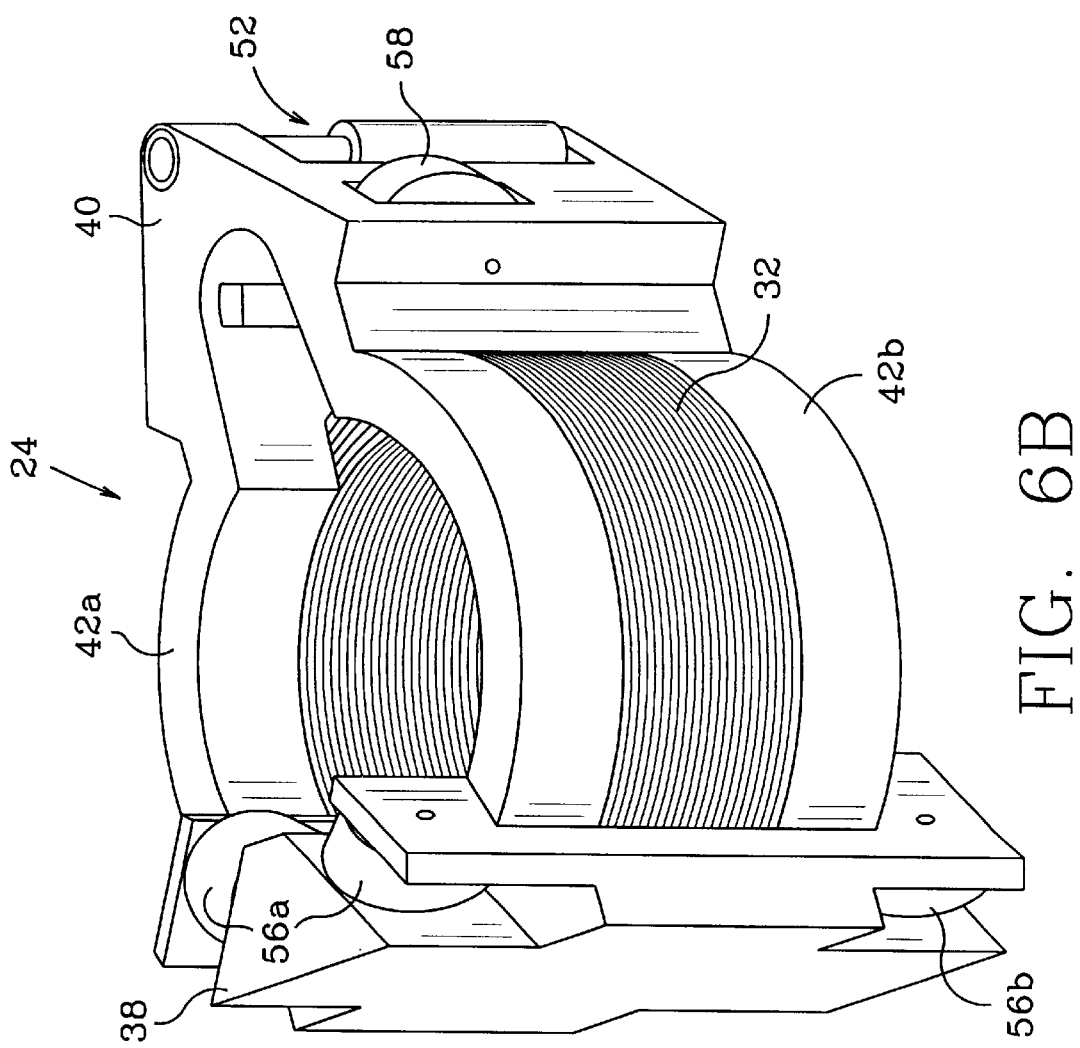

The details of carriage 24 are best seen in FIGS. 6A and 6B. FIG. 6A is a perspective view of carriage 24 without coil 32. FIG. 6B is a perspective view of carriage 24 with coil 32 installed. Referring to FIGS. 6A and 6B, carriage 24 includes a front portion 38, a back portion 40 and truncated ring shaped center portions 42A and 42B that join the front and back portions 38, 40. Center portions 42A and 42B are positioned inside a circumferential perimeter defined by magnets 34. The ring shaped center portions 42A and 42B are spaced apart a distance equal to or slightly greater than the height (the axial dimension) of coil 32. Coil 32 is sandwiched between and firmly attached to ring shaped center portions 42B and 42C in carriage 24. Coil 32 is exposed at cavities 44 formed on each side of carriage 24 between ring shaped center portions 42A and 42B.

Referring again to FIGS. 2–5, a post 46 extends vertically through the center portion of coil 32. In the embodiment of the invention shown in the drawings, post 46 is the upright core portion of actuator base 50. Primary guide rail 26 extends up along a V-shaped trough 48 formed in the front side of core 42. Secondary guide rail 28 is positioned at the back of carriage 24 just outside coil 32. Head 18 is mounted to front piece 38 of carriage 24. If necessary or desirable, a position sensor 52 that reads the vertical position of carriage 24 may be mounted between back piece 40 and actuator base 50. Carriage 24 travels along primary guide rail 26 on two pairs of bearings 56A and 56B mounted in the front piece 38 of carriage 24. Carriage 24 travels along secondary guide rail 28 on one pair of bearings 58 mounted in the back piece 40 of carriage 24. Preferably, bearings 56A are mounted at the top of carriage 24, bearings 56B are mounted at the bottom 62 of carriage 24, and bearings 58 are mounted at the middle of carriage 24. In this configuration, bearings 56A and 56B control the position of carriage 24 in the azimuth direction, indicated by arrow A in FIG. 5, and the zenith direction, indicated by arrow Z in FIG. 3A. Bearings 58 control the position of carriage 24 in the yaw direction, indicated by arrow Y in FIG. 4.

Figure 7:
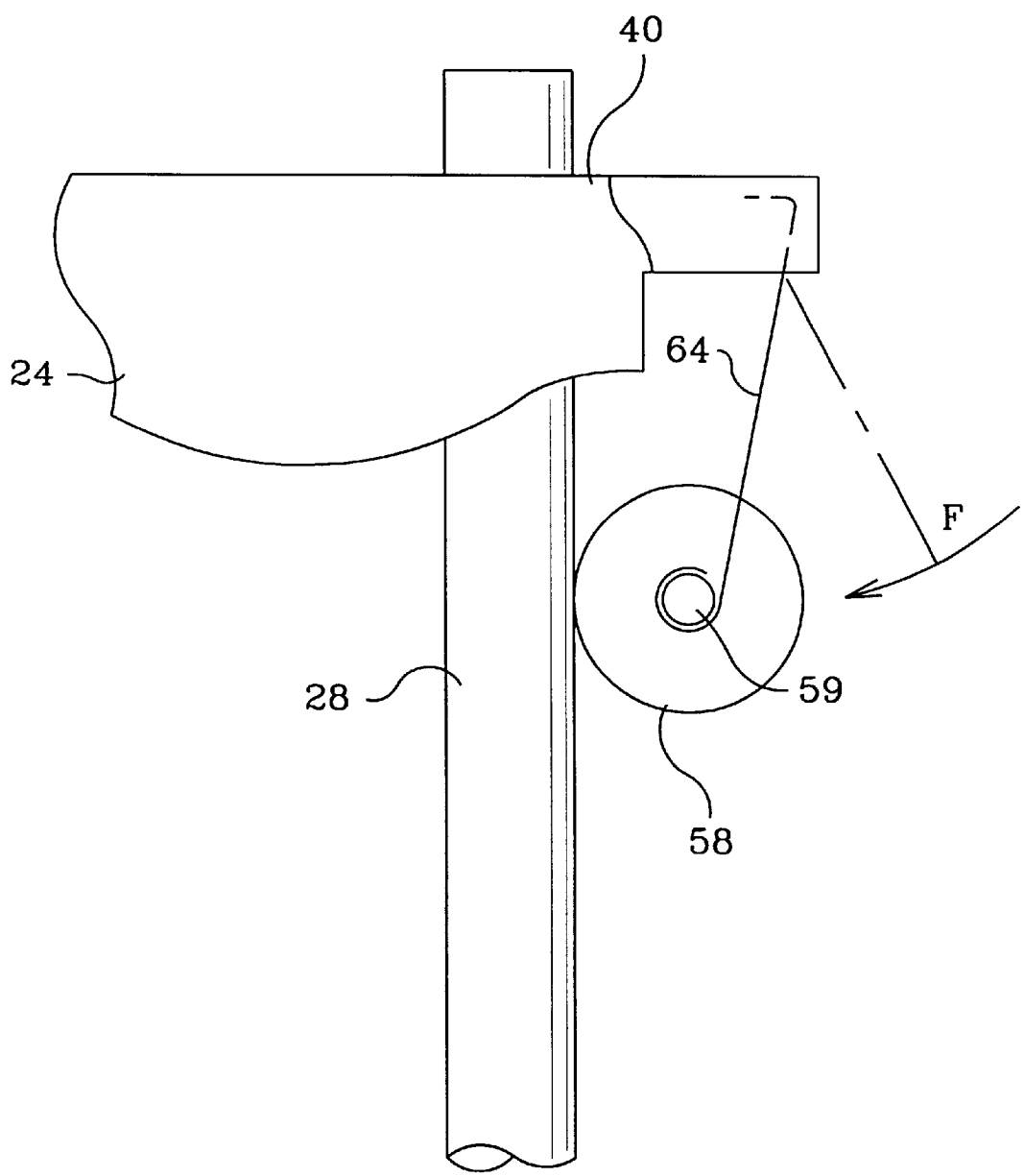
FIG. 7 is a detail side elevation view of the back portion of the carriage showing one type of bearing preload mechanism.

It may be desirable to preload one or both bearings 58 against secondary rail 28 to maintain contact of all of the bearings against the rails. One type of bearing preload mechanism is shown in FIG. 7. Referring to FIG. 7, one or both of the secondary rail bearings 58 are spring loaded against secondary guide rail 28. A spring 64, which supports bearing 58, extends between back portion 40 of carriage 24 and bearing shaft 59. Spring 64 generates a spring force F that pushes bearing 58 against secondary guide rail 28 and pulls carriage 24 rearward. The rearward pull of carriage 24 urges the primary guide rail bearings 56 against primary guide 26.

Figure 8:
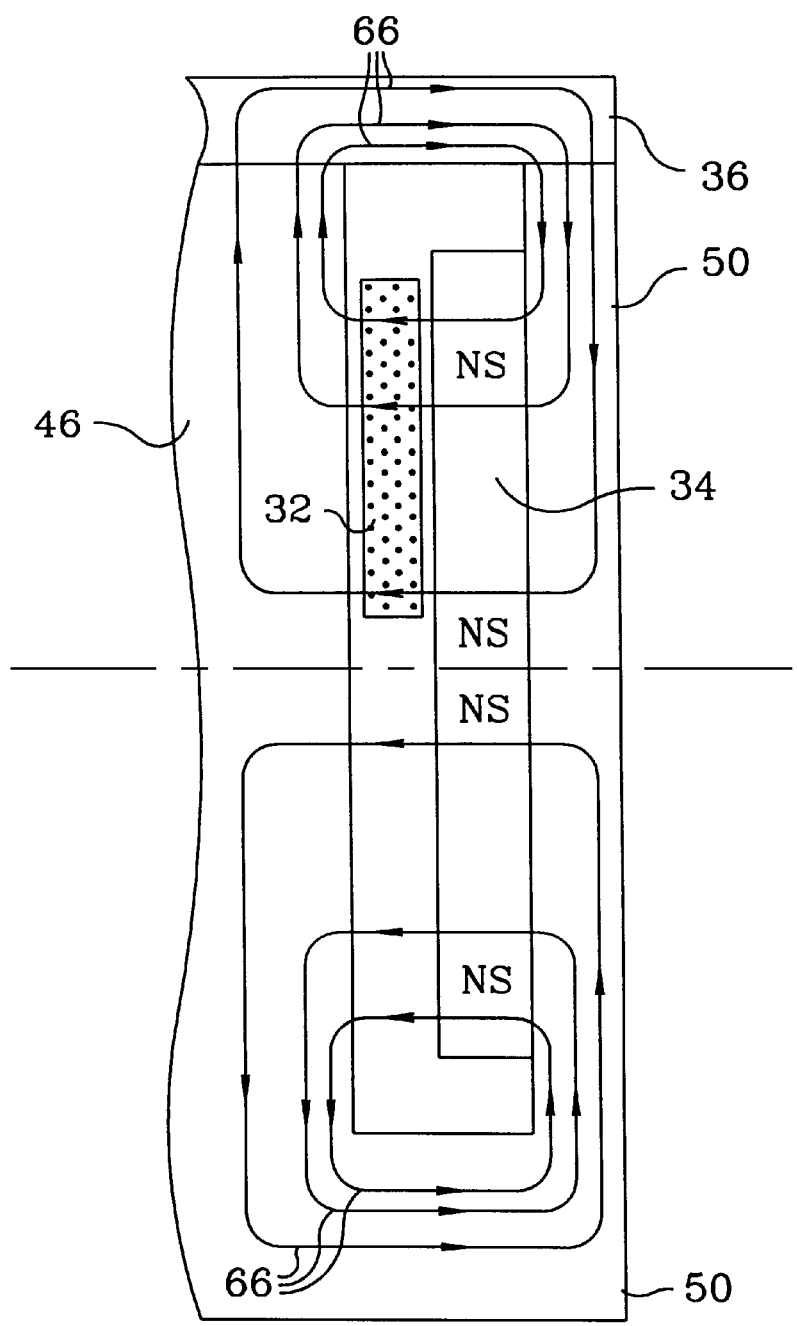
FIG. 8 is a representational side view of the actuator showing the magnetic flux in the voice coil motor.

In operation, actuator 22 positions head 18 relative to tape 12 according to positional information recorded on tape 12. It may be desirable, and in some cases necessary, to make one or all of top flux plate 36, post 46 and actuator base 50 from a soft magnetic steel to carry the magnetic flux 66 generated by magnets 34 through the space occupied by coil 32, as shown in FIG. 8. A servo control signal is generated from the positional information on tape 12 through servo control circuitry (not shown) and delivered as an electrical current to voice coil 32. The presence of current in coil 32 in the magnetic field generated by magnets 34 creates a vertical force on coil 32 and, correspondingly, on carriage 24. This vertical force moves carriage 24 and head 18 up or down as necessary to properly position head 18 relative to tape 12.

The position of primary guide rail 26 inside coil 32 and the position of bearings 56A and 56B above and below coil 32 minimizes the amount of mass needed at the back of carriage 24 to place the center of gravity of carriage 24 at the same location as the center of force exerted by voice coil motor 30. Positioning the center of gravity of carriage 24 at the same location as the center of force of voice coil motor 30 reduces the amplitude of the carriage rocking modes. So, by locating primary guide rail 26 inside coil 32, the overall mass of carriage 24 can be reduced. A more compact design can also be achieved by positioning coil 32 between primary guide rail bearings 56A and 56B. This configuration allows the positioning of head 18 closer to the center of force of voice coil motor 30 to further reduce the size and mass of carriage 24.

It is desirable to glue or otherwise fasten primary guide rail 26 to post 46 to increase the stiffness of primary guide rail 26. In addition, fastening primary guide rail 26 to post 46 eliminates the need to provide other support for primary guide rail 26, particularly at the ends of the primary guide rail. The added stiffness allows higher resonant frequencies of the rocking modes of carriage 24 and, hence, a higher band width for the servo control system. It is also desirable to separate upper guide bearings 56A from lower guide bearings 56B as much as possible without exceeding the vertical height limitations of actuator 22 and tape drive 10. Since the lowest stiffness member in determining the carriage rocking frequencies is the bearings, spreading the bearings as far apart as possible increases the effective stiffness of the carriage guide system. So, by maximizing the spacing between bearings 56A and 56B, the resonant frequency of the carriage rocking modes can be made as high as possible for a given stiffness of bearings.

Figure 6C:
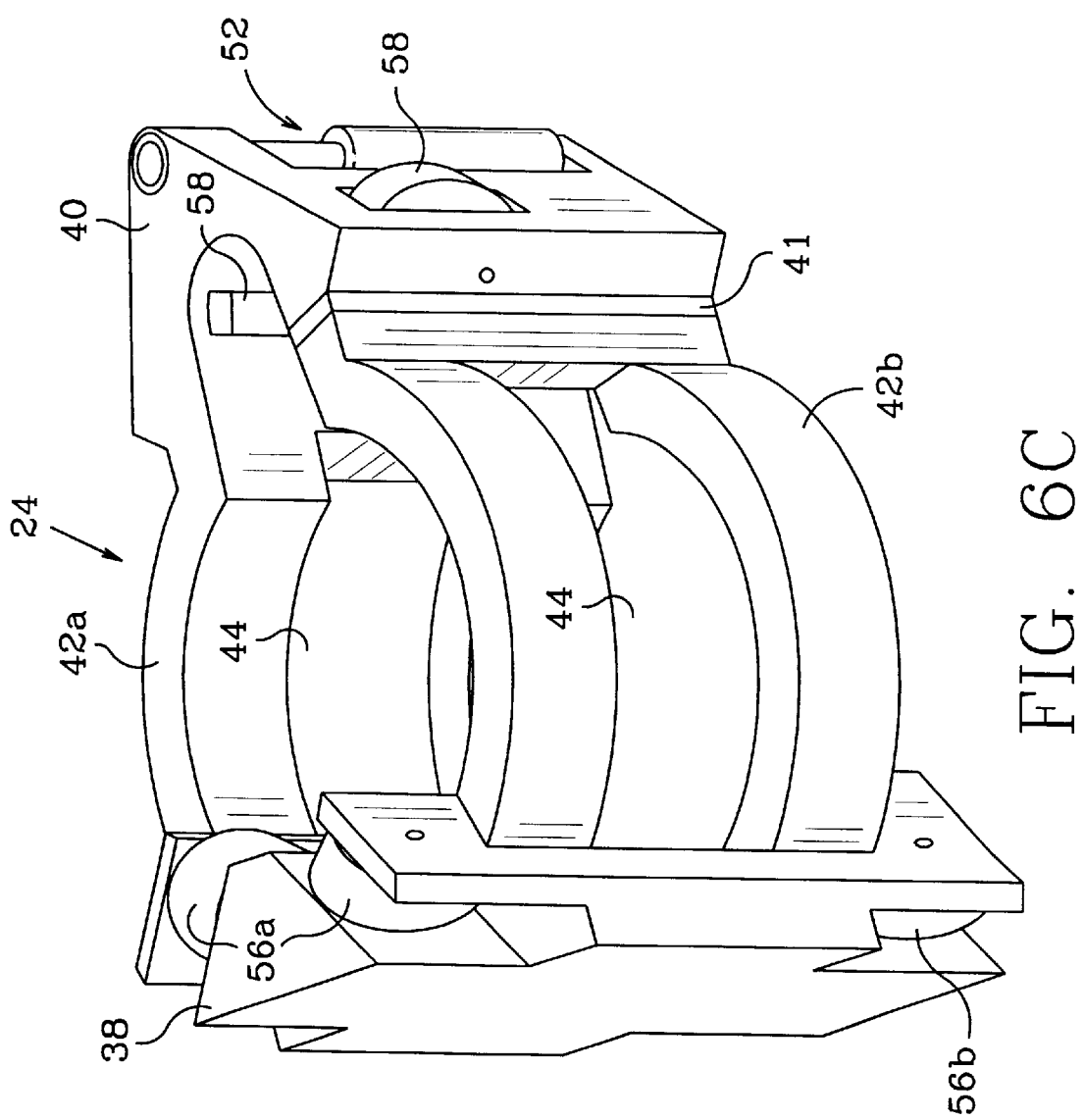

If carriage 24, or at least one of the center portions 42A and 42B, are made of conductive material, then the carriage will form an electrically conductive loop in the magnetic flux of voice coil motor 30. The movement of carriage 24 as it is driven by motor 30, therefore, will generate an electrical current through this conductive loop. The current in carriage 24 generates a damping force that acts on carriage 24 in a direction opposite the direction of travel and is proportional to the velocity of the carriage. This damping force can be avoided by making carriage 24, or at least the center portions 42A and 42B, from a non-conductive material or by forming a non-conductive break in the otherwise conductive carriage loop. FIG. 6C shows such a non-conductive break in carriage 24. Referring to FIG. 6C, a strip 41 of adhesive material fills a break made in carriage 24 near one of the junctions of back portions 40 and center portions 42A and 42B. Although any electrically non-conductive material may be used, an epoxy or other strong adhesive is preferred to help maintain the structural integrity of carriage 24.

"Bearings" as used in this Specification and in the claims means any suitable object, structure or surface that moveably supports the carriage for travel along the rails. Suitable bearings may include, for example, ball bearings, roller bearings, Gothic arch bearings, journal bearings, bushings and the like.

Although the invention has been shown and described with reference to a head carriage and actuator assembly for a tape drive, the invention may be embodied in other carriage and actuator assemblies, structures and designs. For example, the invention could be incorporated in many different types of servo positioned actuators that use a voice coil motor. The voice coil motor might be configured so that the magnets are secured to the head carriage and the coil remains stationary. And, the coil need not be annular. A square or rectangular coil may be appropriate in some applications. The post and the primary guide rail could be formed as an integral unit, rather than the discrete components described above. The sidewalls of the actuator base might be formed integral to the base foundation, as shown in FIGS. 2, 5 and 6, or the sidewalls might be formed integral with the top plate and separate from the base. Therefore, it is to be understood that these and other variations of and modifications to the embodiments shown and described may be made without departing from the spirit and scope of the invention as defined in following claims.

What is claimed is:

1. A head carriage and actuator assembly for a tape drive, comprising:
   a motor comprising a coil of electrically conductive windings and a magnet adjacent to the coil, the motor having a central portion defined by an inside perimeter of the coil;
   a first guide rail extending axially through the central portion of the motor and a second guide rail positioned wholly outside the central portion of the motor parallel to the first guide rail;
   a carriage supported on and moveable along the first and second guide rails; and
   a magnetic read/write head coupled to the carriage, the head positioned outside the central portion of the motor opposite the second guide rail such that the first guide rail lies between the head and the second guide rail.

2. The assembly according to claim 1, wherein the coil is an annular coil and the second guide rail is positioned radially opposite the first guide rail.

3. The assembly according to claim 1, further comprising first bearings mounted to the carriage and second bearings mounted to the carriage at a location spaced apart from the first bearings, the first bearings engaging the first guide rail to facilitate movement of the carriage along the first guide rail and the second bearings engaging the second guide rail to facilitate movement of the carriage along the second guide rail.

4. A head carriage and actuator assembly for a tape drive, comprising:
   an annular coil of electrically conductive windings;
   an arcuate magnet surrounding at least a part of the coil;
   a post extending axially through the inside of the coil;
   a first guide rail secured to the post and extending axially through the inside of the coil along the post;
   a second guide rail disposed outside the coil radially opposite and parallel to the first guide rail; and
   a head carriage moveably coupled to the first and second guide rails for travel thereon.

5. The assembly according to claim 4, further comprising first, second and third bearings mounted to the carriage, the first and second bearings engaging the first guide rail at locations spaced apart axially from one another and the third bearings engaging the second guide rail at an axial location between the first and second bearings.

6. The assembly according to claim 5, wherein the first and second bearings are spaced apart a distance greater than an axial dimension of the coil.

7. The assembly according to claim 5, wherein the coil is positioned axially between the first and second bearings.

8. A head carriage and actuator assembly for the tape drive, comprising:
   a coil of electrically conductive windings, the coil defining an inside area substantially surrounded by the coil;
   a magnet disposed outside and adjacent to the coil;
   a first guide rail extending axially through the inside all the coil;
   a second guide rail disposed outside the coil opposite and parallel to the first guide rail;
   a carriage moveably coupled to the first and second guide rails for travel thereon; and
   a magnetic read/write head coupled to the carriage, the head positioned outside the coil opposite the second guide rail such that the first guide rail lies between the head and the second guide rail.

9. The assembly according to claim 8, wherein the coil is an annular coil and the second guide rail is disposed radially opposite the first guide rail.

10. The assembly according to claim 9, wherein the coil is integrated into the carriage for movement therewith.

* * * * *

UNITED STATES PATENT AND TRADEMARK OFFICE
CERTIFICATE OF CORRECTION

PATENT NO.     : 6,333,838 B1
DATED          : December 25, 2001
INVENTOR(S)    : James C. Anderson It is certified that error appears in the above-identified patent and that said Letters Patent is hereby corrected as shown below:

Column 6,
Line 21, delete "all" and insert therefor -- area of --

Signed and Sealed this

Eighth Day of March, 2005

JON W. DUDAS
*Director of the United States Patent and Trademark Office*